(No Model.) 4 Sheets—Sheet 1.

F. A. OLIVA.
BAND CUTTER AND FEEDER FOR THRASHING MACHINES.

No. 520,216. Patented May 22, 1894.

Witnesses
Edwin L. Bradford
Windsay Lowery

Inventor
Frank A. Oliva
By Johnson & Johnson
His Attorneys.

THE NATIONAL LITHOGRAPHING COMPANY,
WASHINGTON, D. C.

(No Model.) 4 Sheets—Sheet 2.

F. A. OLIVA.
BAND CUTTER AND FEEDER FOR THRASHING MACHINES.

No. 520,216. Patented May 22, 1894.

(No Model.) 4 Sheets—Sheet 3.
F. A. OLIVA.
BAND CUTTER AND FEEDER FOR THRASHING MACHINES.
No. 520,216. Patented May 22, 1894.

(No Model.)

F. A. OLIVA.
BAND CUTTER AND FEEDER FOR THRASHING MACHINES.

No. 520,216.

Patented May 22, 1894.

Witnesses
Edwin L. Bradford
Woodbury Lowery

Inventor
Frank A. Oliva
By Johnson & Johnson
His Attorneys

UNITED STATES PATENT OFFICE.

FRANK A. OLIVA, OF ALTON, KANSAS.

BAND-CUTTER AND FEEDER FOR THRASHING-MACHINES.

SPECIFICATION forming part of Letters Patent No. 520,216, dated May 22, 1894.

Application filed December 15, 1893. Serial No. 493,730. (No model.)

*To all whom it may concern:*

Be it known that I, FRANK A. OLIVA, a citizen of the United States, and a resident of Alton, in the county of Osborn and State of Kansas, have invented certain new and useful Improvements in Band-Cutters and Feeders for Thrashing-Machines, of which the following is a specification.

For feeding grain to thrashing machines I have produced a feeder adapted to feed grain in the "sheaf" as well as "headed grain," and with provisions for cutting the sheaf-band and for loosening, spreading and delivering the grain to the thrashing cylinder in a uniform and compact body. For effecting these objects I have made certain novel devices and combinations of devices, whereby the band-cutters may be adapted for use or for non-use, in feeding "sheafs" or for feeding "headed grain" and for all conditions of grain. In the construction of the feeder I have made provision for the adjustment of all the operating parts to regulate the feed and the coacting devices which spread and deliver the grain to the thrashing cylinder, according as it may be in large or small "sheafs," light or heavy, or "headed grain."

An important feature of my invention resides in the construction of the grain feeding-table and in the provision whereby it may be adjusted to increase or diminish the speed of the feed and deliver the grain compactly to the toothed cylinder, all of which I will now describe in connection with the accompanying drawings, and specifically point out in the claims concluding this specification the parts and combinations of parts which constitute my improvements.

Referring to the drawings:
Fig. 4
45 is a cross section of the machine.

Figures 1, 7, 8, 9:
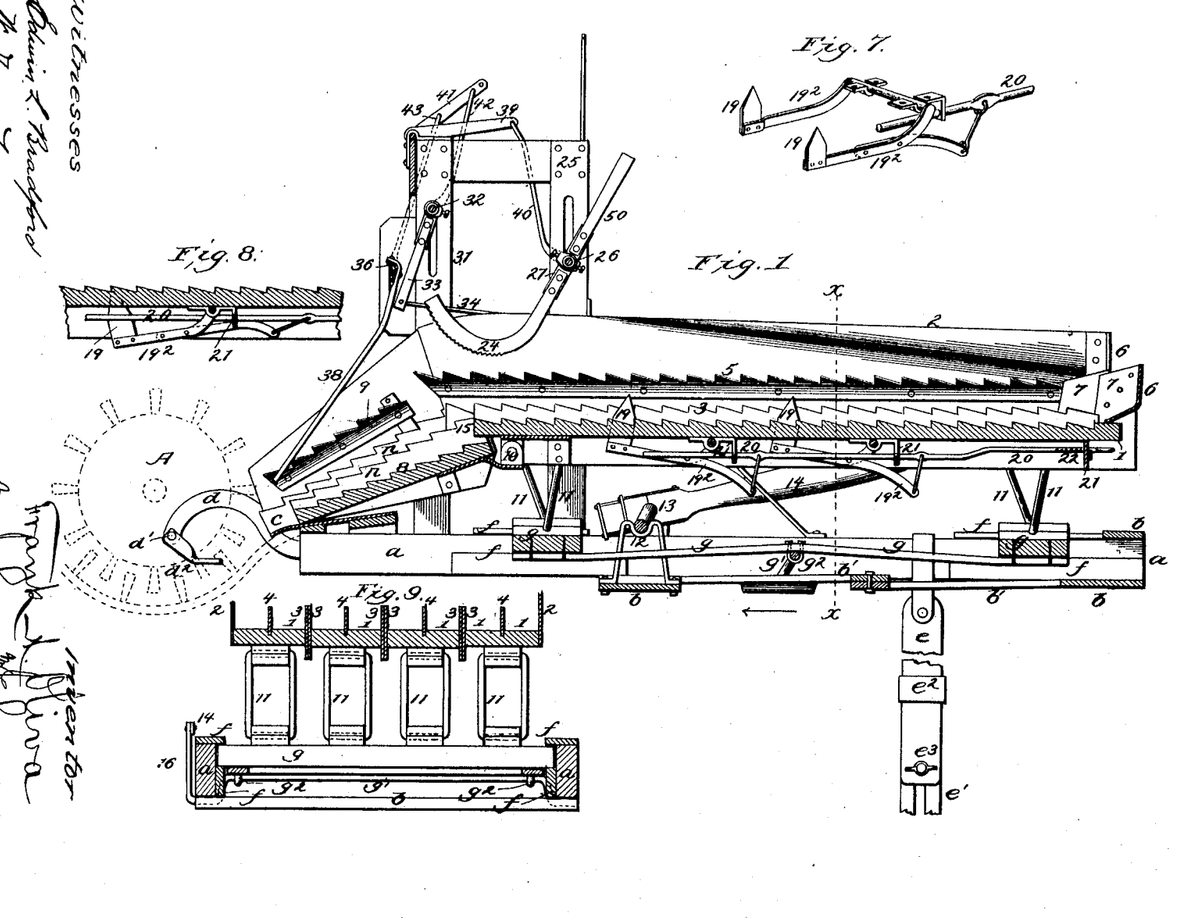
Figure 1 is a longitudinal section of a band-cutter and feeder for grain thrashing machines embodying my improvements.
Fig. 7 shows one of the pivoted yoke levers connecting a pair of cutters and the operating connections for said yoke lever;
Fig. 8 is a detail section showing the provision for turning the feed table band cutters down out of use.
Fig. 9 is a section of the feed-table and its adjustable frame.
Figures 2, 12:
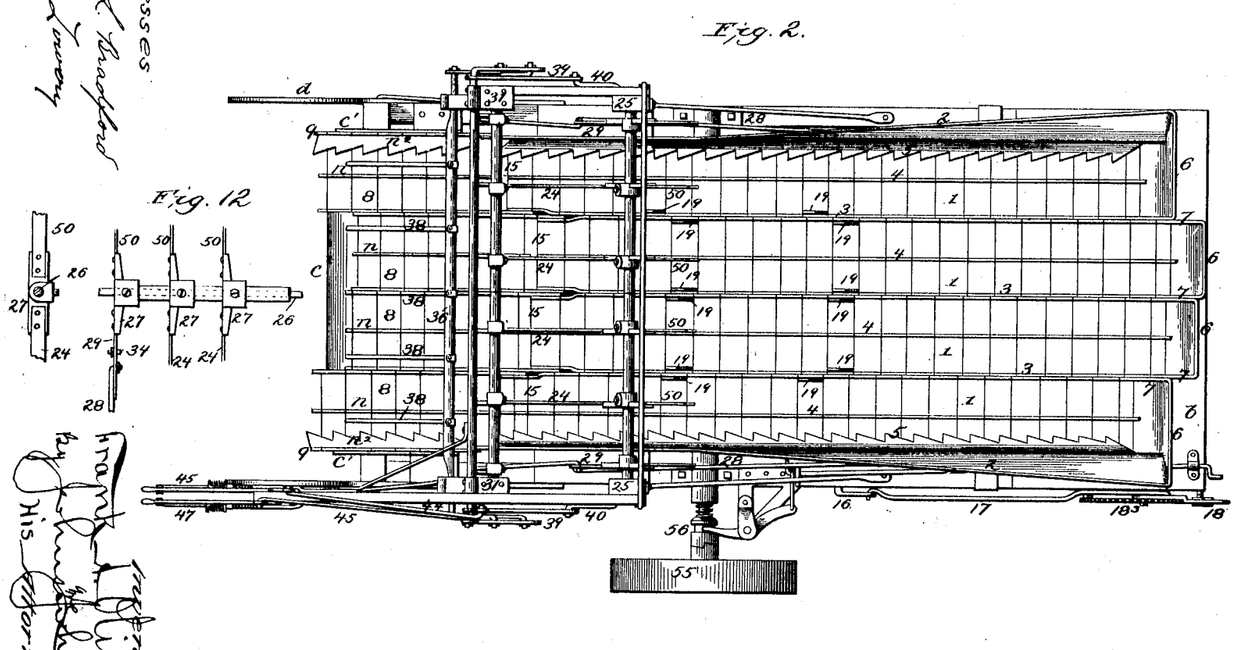
Fig. 2 is a top view of the same.
Fig. 12 shows the sockets for the top band-cutters.

From the feeder the grain is delivered to the cylinder which separates the grain from the straw, and in the drawings I have shown so much of a thrashing machine in which the cylinder A is arranged and in which the thrasher-frame is connected with the feeder-frame. The feeder-frame is constructed of side bars $a$ connected by cross bar $b$ and suitable diagonal braces $b'$, forming an open oblong fixed frame. At the forward end which connects with the concave of the thrashing cylinder, this frame has a transverse shoe-plate $c$ which forms a shoe the front edge of which overhangs the edge of the cylinder-concave and joins the feeder proper therewith. At each side this front end of the frame is provided with arms $d$ preferably of goose-neck form having holes $d'$ in their ends, and each side of the thrasher frame is provided with metal sockets $d^2$ into which the said goose-neck arms are secured by pins which form pivot connections for the front end of this frame. At its rear or receiving end this frame is provided with extensible legs which are pivoted to its side bars $a$ $a$ by loops or otherwise, and by these extensible legs the rear end of the frame can be set higher or lower with respect to a horizontal plane for a purpose to be presently stated. The legs are of lapping parts $e$ $e'$, connected by loops $e^2$ and clamp-screws $e^3$, but any suitable adjusting support may be used. Upon and within this fixed frame, the feeding-table proper is supported and feeds the grain to the thrashing cylinder, as I shall now describe. This frame preferably on the inner sides of its side bars, is provided with suitable ways or guides $f$ Figs. 1 and 9, within which is confined a supplemental frame $g$, which carries the feeding-table and is adapted to have a horizontal sliding adjustment within said guide ways. This adjustment is effected by means of a cranked-rod $g'$ mounted transversely upon the side bars $a$ $a$ of the fixed frame at or about the middle thereof, the cranked part of which rod is between the said side bars of the fixed frame and connected by eyes $g^2$ to the side bars of the supplemental frame $g$ so that the cranked part of said rod stands upward and as it is turned toward the front moves the supplemental frame in that direction, and when turned toward the rear moves the supplemental frame back as seen in Fig. 1, for a purpose and by means which I shall presently state; but it will be understood that these two frames are only connected by this cross cranked-rod: and also that the feed-table proper is mounted directly upon the supplemental frame and is moved with it upon the fixed frame. The feeder proper is formed like the body of a wagon, and is composed of a series of longitudinal sections 1, 1, joining each other so as to form a feed-table each section having an independent reciprocating movement to effect the feed of the grain thereon. The outside sections have raised sides 2, 2, and all the sections have raised rear ends. At the joining edges of these sections they are provided with raised teeth 3, 3, preferably of saw-tooth shape standing toward the front, and these teeth are preferably formed by plate-strips, raised above the surface of the sections. In the middle, longitudinally of each section, a like toothed-plate 4 is placed; and on the inner walls of the outside sections are like toothed-plates 5, all the teeth of which stand toward the front. The raised rear ends 6, of the table have also their sides 7, raised a sufficient distance to prevent any opening at this end of the table by the alternate reciprocating movement of the sections.

Usually the feed-table is supported so that it will stand at a downward inclination toward the rear or receiving end, and this inclination will be governed according to the character of the grain and the rate of feed required over the toothed surface, but it may be set substantially horizontal. Each toothed table section has a short toothed feeder section 8, hinged so as to stand on a downward inclination to the front and rest on the front shoe-plate $c$ of the fixed feeder-frame, in position to deliver the grain to the thrashing cylinder with a considerably greater feed than it has on the receiving part of the table. These short hinged feed sections 8 form extensions of each table-section, of about one-fourth the length of the latter and have toothed plates $n$, $n^2$ corresponding with those of the long parts and are reciprocated by and with them so that the feeding-table has a unitary toothed feeding surface of opposite inclines. The feeding surface between these toothed plates is provided with transverse projections, which may be like steps or saw-teeth standing forward to aid in feeding the grain. The outside sections of the short hinged feed parts have raised guards to form sides 9 which lap outside of the corresponding sides of the first described long table-sections and are held together at such laps by ears or lugs 10; while the raised ends $c'$ $c'$ of the fixed cross-plate or shoe lip $c$ serve to hold the discharge ends of the short hinged feeder sections together longitudinally on said cross-lip. The cross-plate $c$ in this way forms a shoe within which the front ends of the feed-table sections reciprocate and also forms a fixed connection with the cylinder concave. The supplemental adjusting frame is about two-thirds the length of the leg supporting frame and at each end the cross-bar of this supplemental frame has links 11, which are suitably connected in pairs to the under side of each toothed table-section, and by which the latter are reciprocated in the arcs of circles and are held in joining relation at their rear or receiving ends. On these links the table-sections are supported and reciprocated simultaneously in their feeding action of the grain to the thrasher. This reciprocation of the separate table sections is effected by a multiple cranked-shaft 12, mounted on the side bars of the leg supporting frame, and having its separate cranks 13 connected by separate rods 14 to the under side of each separate long table section, so as to move the several feed sections simultaneously and alternately back and forth. These cranks are so disposed that no two table-sections move in the same direction together. As shown the feeder table is made of four sections; and the cranks are formed on one-quarter circles to give the movement stated.

I prefer to hinge the short feeder-sections by lugs and pins to the under sides at the front ends of the long feeder table-sections Fig. 1, so that the straw in passing over the latter will receive a pushing action upon the hinged sections, by said ends 15, which has the effect of delivering the grain uniformly upon and from the short feeder sections. As the short feeder-sections rest and slide at their lower ends upon the fixed cross-plate or lip $c$, and are hinged at their upper ends to the ends of the long feeder-sections, the reciprocating movement of the latter will cause the upper hinged ends of the lower sections to have a vertical vibration which thereby acts to loosen and spread the bundle of grain and help to push it upon these short feeder-sections, and it will be seen that this advantageous operation of one part of the feeder table is derived from the connection and movement of the other section of said table, therewith. In other words, this reciprocating table of longitudinal toothed feeding sections, has its front delivering part hinged directly to it, and is reciprocated by it, the said hinged-part being sustained upon a fixed part, so that the reciprocation of the connected table-parts will cause the upper end of the hinged part to have a vertical vibration, which will give to the downwardly inclined hinged part a distinctively pushing action upon the grain toward the cylinder of the thrasher. It is this construction of the feed-table that gives to its delivering part a compound movement which I find gives a very satisfactory pushing and spreading action upon the grain at the point where it is fed to the separating cylinder. The hinged-sections however, may join the long sections so that their surfaces will be on a level at such joining.

Figures 3, 5, 10, 11:
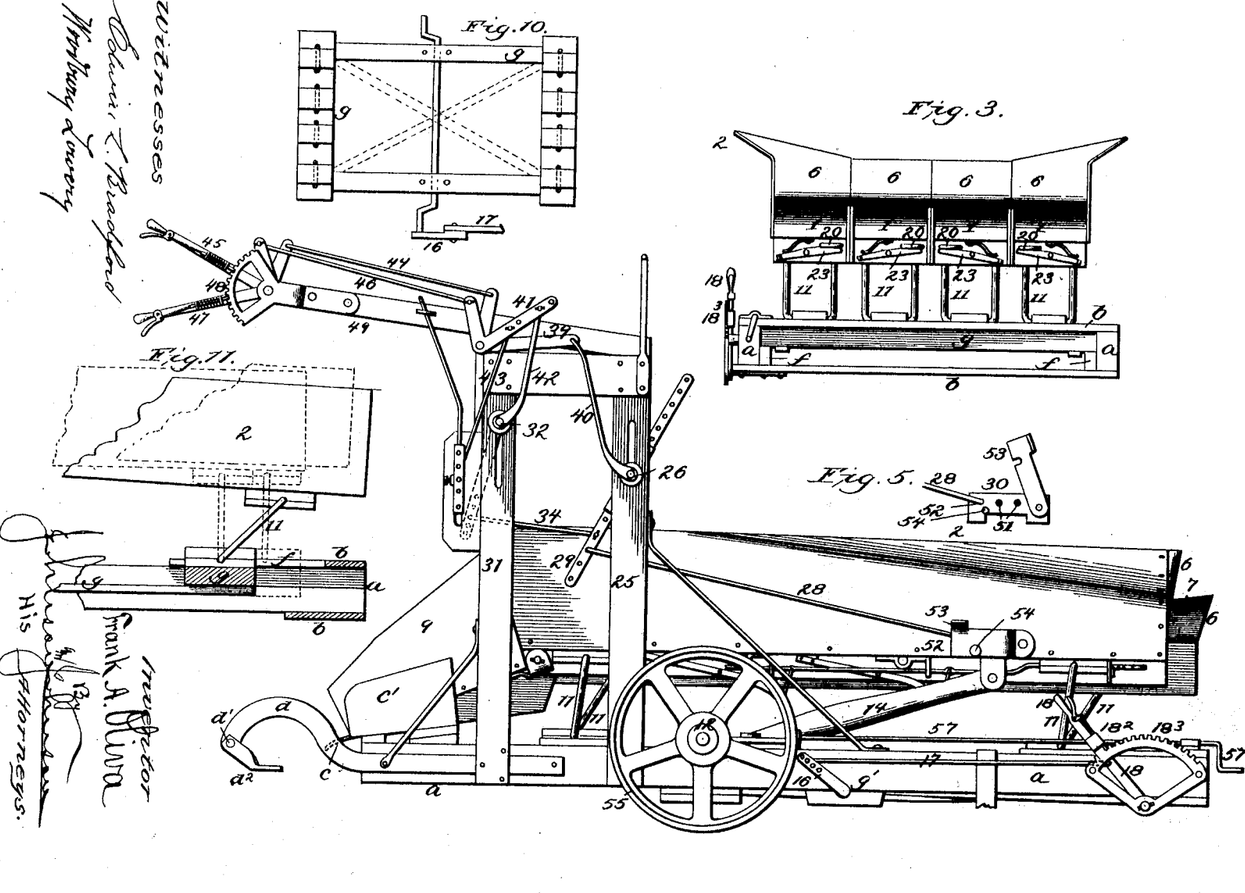
Fig. 3 is an elevation of the rear or receiving end of the same.
Fig. 5 is a side elevation.
Fig. 10, shows the adjustable frame.
Fig. 11 shows the manner of adjusting the throw of the 55 feed-table.
Figure 4:
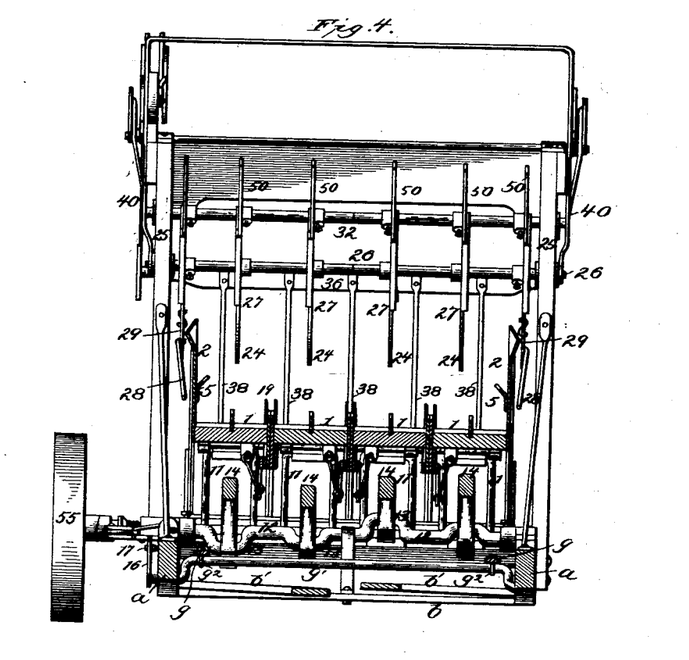

In connection with the longitudinal reciprocating movement of the feed-table sections in the arcs of circles on the links, I provide for giving it as a body more or less vertical throw for the purpose of giving the grain more or less speed over and upon the toothed-sections to suit the character of the grain and for long or for "headed-grain." The means for giving this adjustment of the vertical throw as seen in Figs. 9, 10, and 11, consists in the provision of the supplemental frame $g$ and the cranked-rod $g'$ by which said frame is adjusted horizontally so as to set the lower end of the links 11, forward or backward, relatively to the main crank-shaft see Fig. 11. The cranked-rod $g'$ is operated by a crank-arm 16 and a rod 17 adjustable upon said crank-arm 16, and connecting it to a hand-lever 18, which, by a spring catch $18^2$, engages a rack on the frame $a$, to hold the said supplemental frame in position when set by the crank-rod. When the cranked portion of this rod $g'$ is set in a vertical position by the movement of said frame toward the front, the vertical throw of the table by its links will be at its minimum, but when the cranked-rod is turned down toward the front the said frame will be moved in the same direction and with it the lower ends of the links, slanting the latter backward as seen in Fig. 11 and thereby causing them to act with a greater vertical throw of the feed-table sections by their vibrations, and in this way co-operate with the longitudinal reciprocating movements of said table-sections to regulate the speed of the forward movement of the grain to the thrashing cylinder. In this adjustment of the cranked-rod, it may be turned nearly through the arc of forty-five degrees, and for this purpose its crank-arm 16 has one or more holes for its connecting rod 17, so that the latter can turn said crank-arm down more or less to a horizontal position and thereby give more or less sliding adjustment to the supplemental frame to give the feed-table links more or less vertical throw by moving their lower ends, so that in the reciprocating movement of the feed-table sections, the upper ends of their connecting links will not pass forward of a vertical line drawn from the lower ends of said links, as seen in dotted lines in Fig. 11.

I provide the machine with knives for severing the band of the sheaf, and also with beaters and with fingers for loosening and spreading and holding the grain down as it enters the thrasher, after the band is cut, and which I will now describe. I place knives 19, which are of thin blades preferably at the edge of each table-section by the side of the toothed-plates 3, 3, so that the knives can be raised above said plates and depressed below the table-surface; as well as being adjustable at different heights above the feed-table surface as seen in Figs. 1 and 8. When so raised the sheaf band is cut when passing over them as it is fed forward by the reciprocating and vertical movements of the table sections. These knives are small blades with cutting edges preferably of spear shape so as to cut both ways, and are riveted to the ends of levers $19^2$ which are pivoted to the under sides of the table-sections and connected to rods 20 which are fitted in guides 21 on the under sides of said table sections and extend to the rear ends thereof where they are formed with a toothed-part 22 for engagement with a spring catch 23 Fig. 3, by which the knives are held in action above the table surface, or out of action below the table surface or adjusted to the required height. This provision for withdrawing the knives below the feeding-surface of the table sections is to adapt the feeder for headed grain, which of course is not in "sheaf" form and has no binding band. Each of these table-sections may have one or more sets of knife-blades to cut the band in different places, and I prefer to arrange them alongside of the feeding toothed or notched plates 3, and which latter I prefer to extend below the bottom of said table-sections as a means of supporting and pivoting the knife-blades 19 and their operating levers $19^2$. When the knife-blades are used in pairs I prefer to connect them to the ends of a yoke or bail-shaped lever, so as to set and adjust the blades in pairs by one connecting rod 20, as seen in Fig. 7.

Figure 6:
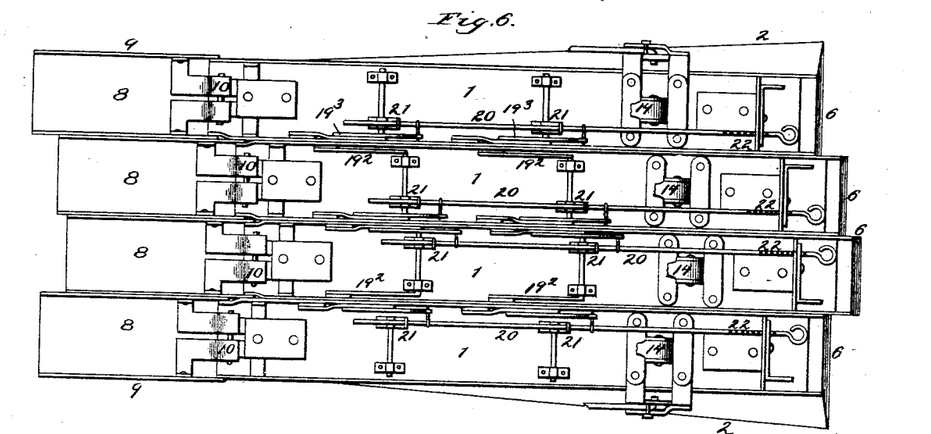
Fig. 6 is a bottom view of the feed-table.

In the arrangement of the knife-blades at the joining edges of the oppositely reciprocating feed-table sections, I obtain the advantages of operating the blades back and forth side by side, so that they practically operate together in pairs, and aid each other by a shear like cut and thereby render the cutting of the band more certain and at several places which allows the bundle of grain to spread and fall apart more easily. This cutting action is greatly facilitated because each blade having a spear form will cut the band by both the forward and backward movements of said table-section to which the blade is fixed. Moreover, the arrangement of the toothed-plates and the knife-blades at the joining edges of the table-sections co-operate to give a better holding action upon the sheaf while cutting the band. The cutting blades of the intermediate table-sections are connected together in pairs of one or more sets by the yoke-levers separately pivoted as stated, but the blades of the outside table-sections are connected singly by separate levers $19^3$, Fig. 6, but in either case all the cutting-blades of each table section are raised or depressed simultaneously by a single locking rod. As these knife-blades only cut the tie-band at the under side of the sheaf, the latter will partially hold together at the top, and I, therefore, provide for cutting the band at the top as well as at the bottom of the sheaf. The top knives are formed of curved-blades 24, sickle edged, the curve standing toward the front and in position about over the front set of knife-blades in the feed-table. Standards 25 of the legged frame support a horizontal rod 26, over the feed-table, and from this rod the curved-knives depend and are operated in pairs so that their cutting action will be on their rearward movement and act with a draw-cut against the feed of the grain. I prefer to arrange the top-knives in two sets, one set over each table-section, and to give these sets alternate opposite vibration and so that their cutting strokes will be timed with the front ward movement of each outside table-section and thus not interfere with the feed of the grain in their cutting action. I prefer to secure the curved-knives in sockets 27 which can be adjusted and clamped upon a piece of gas-pipe loose upon said rod 26, the gas-pipe being rocked by rods 28 which are adjustably connected to arms 29 fixed on one end of said gas-pipe and to brackets 30 on each side of the feeder-table so that the reciprocating movement of the latter will vibrate the curved-knives in unison with the movement of said outside table-sections. By this construction the reciprocating movement of each side table section is utilized to vibrate cutting-blades or beater-blades in pairs in opposite directions for use as band-cutters or for spreading "headed-grain" when the cutters are not used. Each pair of cutter or beater-blades is fixed on a separate pipe-section and each pipe-section is separately rocked by connecting rods 28 at each side of the feed-table. In like standards 31 on the leg supported frame I place another horizontal rod 32 and on it I loosely place pipe-sections and suitable adjusting clamp-sockets, having straight beater-blades 33 arranged in pairs in advance of and corresponding with the curved knife-blades. These straight-blades are to beat back and scatter the larger bunches of grain and are operated on their separate pipe-sections in unison with the curved knife-blades by means of rods 34 which adjustably connect arms 35 of the pipe sections on the cross-rod 32 with the pipe-arms 29 on the cross-rod 26, so that the movement of the table-sections will operate both sets of knife and beater-blades to effect the complete cutting of the sheaf-band and to even and level the bundle of grain, after its tie-band is cut. In advance of these beater blades I fix upon a cross-rod 36 in the front standards 31, a series of fingers 38 which stand inclined close to the cylinder of the thrashing machine and serve to hold down and even and render uniform the feed of the grain.

The cross-rod 26 of the top curved knife-blades is made vertically adjustable in slots in the standards by means of levers 39 pivoted to the tops of the front standards and connecting by rods 40 to the ends of the said rod 26, so as to set these knife-blades to suit the bundle of grain. The cross-rod 32 of the beater-blades is made vertically adjustable in slots in the standards by levers 41 pivoted to the tops of the front standards and connecting by rods 42 to the outer ends of said cross-rod 32, so as to set these beater blades to suit the grain. The inclined fingers are made vertically adjustable by means of rods 43 connecting the ends of the cross-rod 36 which also moves in slots in the standards, and the levers 41 whereby the beater-blades and the curved-fingers are made vertically adjustable together and by the same connections. The levers 39 which connect with the cross-rod 26 of the curved knife-blades can be operated by the rod 44 and spring catch 45, while the levers 41 which connect the cross-rod 32 of the beater-blades can be operated by the rod 46 and spring catch 47, both said spring catches being adapted to engage racks 48 carried by an arm 49 extending frontward from the top of said standards, whereby these cutting and spreading devices are held in the positions in which they are set. This arrangement of the adjusting devices at the top of the feeder makes it convenient for a person on the top of the thrashing machine to see and determine the necessary adjustments. I may however, arrange such adjusting devices so as to be operated from the ground. In this case I secure the levers 39 and 41, which I prefer to make of bell-crank shape, to the leg supported frame below the feed-table, and connect them by rods with the cross-rods 26, 32, with suitable catch devices. In thrashing "headed grain" I place the band-cutting knives out of working position, by pulling out the rods 20, which connect with the feed-table knife-blades 19, drawing the latter down below the feeding-surface, as shown in Fig. 8. Then I disconnect the cross-rod 26 and its pipe-arm 29, from their operating and adjusting connections and turn the pipe-sections so as to bring their curved knife-blades upward out of the way and again re-connect said cross-rod and pipe-sections to their operating and adjusting connections. As shown, the sockets of these curved knife-blades contain also straight beater-blades 50, which stand in the opposite direction to the knife-blades, so that when the latter are turned up the beater-blades are turned down and serve to spread out the "headed-grain." When thus used these rear beater-blades may be set higher than the front ones and both sets co-operate to even the grain and to scatter any large bunches, so that it will be fed to the cylinder in a loose and uniform body. I provide for increasing or diminishing the stroke or extent of vibration of the curved knife-blades and of the beater, and also for increasing and diminishing the movement of these blade parts, by means which I will now describe. To give these blade-parts a greater or less stroke I set the rods 28, 34, which connect their operating arms 29, 35, nearer to or farther from their respective cross-rods 26, 32, in holes in said arms. When these connecting-rods are set nearer to said cross-rods, the stroke of the blade-parts is increased, and vice-versa. To give the stroke of these blade-parts equal movement on each side of a vertical line from their cross-rods, I set the connecting-rod 28, back at the point of its attachment to the reciprocating table sections, as seen at 51 in Fig. 5; but to give such stroke wholly in advance of such vertical line, I change the connection 51 to the forward hole 52, and as a simple fastening for this rod connection, I provide a bracket-plate 30 with holes in it and fasten it on the sides of the table-sections, and a latch 53 and a latch-pin 54 for confining the bent end of said rod 28 when set in said holes. These adjustments are important to suit the different sizes of sheaves, and light and heavy grain, headed and long. It will be understood that the rod-arms 29, 35, and their connecting rods 28, 34, are the same at both sides of the feeder; and that the inclined fingers 38 have no movement, but are made vertically adjustable by connecting each end of their cross-rod 36, to the same arms of the bell-crank levers 41, which connect with the cross-rod 32 of the rear beater-blades, by the rods 43, so that the same bell-crank levers 41, serve to raise and to lower the fingers 38 and the front beater-blades together and to the same extent.

It will be seen that the raised sides 2, 2, of the feeder-table form parts of the toothed section, and therefore, the feeder requires no fixed inclosing sides as is usual with feeders constructed with alternately movable toothed sections.

The multiple cranked-shaft 12, has a band-driven pulley 55 on one end. This pulley is provided with a suitable clutch 56, which is operated by a rod 57. The action of the links holds the table sections together and causes the sections to rise in the arcs of circles on the forward movement and to drop as they move back; while the forward adjustment of the lower ends of the links with respect to the driving crank-shaft, will cause the links to impart to the table sections an increased vertical forward throw to increase the speed of the feed of the grain, as seen in Fig. 11.

The action of the short hinged sections movable by and with the long sections still further increases the speed of the feed of the grain as it enters the thrasher, and causes them to co-operate with the fixed fingers to push the grain under them and thereby deliver it more compactly to the cylinder. In this action the forward inclined position of the fingers places them directly over the downward inclined short hinged sections and forms a fingered covering for the latter under which the feeder pushes the grain just as it is seized by the cylinder, in relation to which the fingers extend down close to the cylinder to hold the grain thereto as it is being pushed forward.

The construction of the knife-blades with double cutting edges and their relation in juxtaposition on oppositely reciprocating feed-table sections, gives the advantage of a cutting action on the sheaf-band both in the forward and in the rearward movements of said table-sections and of causing the knives to act in pairs at nearly the same point of the band, whereby the action of one blade serves to support the straw against the action of the contiguous blade, and renders more certain the cutting of the band.

It will be understood that the reversing of the position of the band cutting-blades by turning them up is to put them out of use and by the same adjustment put in use blades which act to beat back and spread "headed-grain;" while the front set of fingers act to even the grain just as it enters upon the short downwardly inclined hinged feed-sections, and at the point where the ends of the long table sections have a pushing action upon the grain as it passes under the fixed fingers.

The construction whereby the curved band-cutting blades and the straight spreading and evening-blades are caused to operate simultaneously, gives the advantage of cutting the band and spreading the grain at the same time, both sets of blades acting in the same direction and opposite to the feed of the grain.

The construction whereby all the band-cutters can be put out of action gives the advantage of using the feeder for "headed grain" without any change in the operating parts.

The disposition and connection of the upper cutting-blades for operation in connected pairs or series in alternately opposite directions, gives the advantage of balancing the vibrations of these parts and renders their action more effective in opening and feeding the grain.

I claim as my improvements—

1. In a band-cutter and feeder, the combination of a feed-table composed of oppositely reciprocating sections, each section having toothed plates at their adjoining edges, with band-cutting blades fixed upon crank-arms secured on the under sides of said table sections, and rods connecting said arms, for operation in the way stated.

2. The combination in a band-cutter and feeder of a feed-table composed of oppositely reciprocating toothed-sections, with cutting-blades connected in pairs at the joining edges of said table-sections, and means for adjusting said blades in pairs, substantially as described.

3. The combination in a band-cutter and feeder, of a feed-table composed of oppositely reciprocating toothed-sections, with cutting-blades connected to levers pivoted to the under side of each table-section and rods connected to operate said levers simultaneously and to lock said blades when adjusted, substantially as described.

4. In a band-cutter and feeder, the combination of a feed-table composed of oppositely reciprocating toothed-sections, with yoke-levers having band-cutting blades secured thereto in pairs and arranged at the under side of said table sections, and suitable means for operating said yokes, in the way and for the purpose stated.

5. The combination in a band-cutter and feeder of a feed-table having a reciprocating movement, with band-cutting blades arranged above said table, arms 29 connected to vibrate said cutting-blades and rods 28 having adjustable connection with said arms to vary the extent of the cutting-stroke, and adjustable connection with the feed-table to vary the extent of the rearward movement of said blades in relation to a vertical line drawn through the axis of vibration of said blades, substantially as described.

6. The combination, in a band-cutter and feeder with a feed-table composed of oppositely reciprocating toothed sections, of band-cutting blades fixed in pairs upon separate pipe-parts, a rod 26 loosely supporting said pipe-parts above the table, an arm 29 on the outer end of each pipe-part having a series of holes, a bracket 30 on the outer side sections of said table, and the rods 28, 28, adjustably connecting said pipe-arms and brackets, whereby said cutting blades are adjusted and alternately vibrated, substantially as described.

7. The combination in a band-cutter and feeder with a reciprocating feed-table, of the cross-rod 26, in fixed frame parts, pipe-parts loose upon said rod, and having both cutter and beater-blades standing radially on opposite sides of said pipe-parts whereby they may be reversed to bring into action the cutting-blades or the beater-blades, and means connecting said pipe-parts for imparting thereto a rocking motion upon said rod in the way and for the purpose described.

8. The combination, in a band-cutter and feeder, with a reciprocating feed-table, of the cross-rod 26 in fixed frame parts, pipe-parts loosely mounted upon said rod, and having both cutter and beater blades standing radially on opposite sides of said pipe-parts, means for independently rocking said pipe-parts, means for vibrating and adjusting the extent of the movement of said blade-parts, and means for vertically adjusting said rod, the said blades being adapted to be reversed with respect to the table for use as band-cutters or grain spreaders to adapt the machine as a feeder for "headed-grain" or for grain in the sheaf, substantially as described.

9. In a grain feeder and band-cutter, the combination with a feed-table, of band-cutting blades in said table and means for depressing them below the feeding surface, band-cutting blades above said feed-table and means for turning them up out of the way of the grain whereby to adapt the machine for feeding "headed grain" substantially as described.

10. In a band-cutter and feeder, the combination, with a feed-table composed of oppositely reciprocating toothed-sections, of a cross-rod 26 above said table, independent pipe-parts loose upon said cross-rod, and having curved cutting-blades, and oppositely standing beater-blades, radial-arms 29 on the outer ends of each pipe-part extending on opposite sides of said pipe, and the rods 28 arranged to connect either of said pipe-arms with the outer side table-sections, whereby the said cutting or the said beater-blades may be reversed in position in relation to said feed-table and operated in the way and for the purpose stated.

11. In a band-cutter and feeder, the combination, with a feed table having a reciprocating movement, the cross-rods 26, 32, in fixed frame parts above said table, each rod having radial-blades and radial-arms, the rods 34 connecting the arms of each cross-rod, and the rods 28 connecting the said arms with the table, whereby both sets of blades are vibrated together in the same direction as the feed-table, substantially as described, for the purpose specified.

12. The combination, in a band-cutter and feeder of a feed-table composed of oppositely reciprocating toothed-sections, each section connecting and terminating in a downwardly inclined hinged toothed-part, a fixed supporting shoe upon which said hinged parts ride, fingers arranged in fixed position over said hinged parts, spreader-blades arranged in rear of said fingers, cutting-blades arranged in the rear of the spreader-blades, and means for operating said table-sections and the spreading and cutting-blades in the way and for the purpose stated.

13. The combination, in a grain-feeder of a feed-table composed of oppositely reciprocating toothed-sections, each section connecting and terminating in a downwardly inclined hinged-part, a fixed supporting shoe upon which said hinged-parts ride, fingers arranged in fixed position over said hinged-parts, spreader-blades arranged in rear of said fingers, means for raising and lowering said fingers and spreader-blades simultaneously and means for operating said table-sections, and spreader-blades, substantially as described.

14. In a grain band-cutter and feeder, the combination of a feed-table composed of oppositely reciprocating toothed-sections, each section terminating in a downwardly inclined hinged-toothed part, a fixed supporting shoe upon which said hinged parts ride, fingers arranged in fixed position over said hinged-parts, spreader-blades arranged in rear of the fingers, cutting-blades arranged in rear of the spreader-blades, means for raising and lowering said fingers and spreader-blades simultaneously, means for raising and lowering the cutting-blades, and means for operating said spreader- and cutting-blades and the said table-sections, in the way and for the purpose described.

15. The combination, in a band-cutter and feeder of a feed-table composed of oppositely reciprocating toothed-sections, fingers arranged over the delivering end of said feed-table, spreader-blades arranged in rear of the fingers, cutting-blades arranged in rear of the spreader-blades, means for raising and lowering said fingers and spreader-blades simultaneously, means for raising and lowering the cutting-blades, means for operating the spreader and the cutting-blades simultaneously, means for adjusting the vibrating movements of said spreader and cutting-blades, and means for increasing or diminishing the vertical movements of said feed-table-sections, substantially as described.

16. In a grain-feeder, the combination, with a main frame, a supplemental frame adjustably supported therein, a reciprocating feed-table supported by links upon said supplemental frame and means for operating said feed-table, whereby the supporting links of the latter can be adjusted with said supplemental frame in the way and for the purpose stated.

17. In a grain-feeder, the combination, with a main frame, a supplemental frame within the main frame, a reciprocating feed-table, links supporting the latter upon said supplemental frame, a cranked-rod connecting the said frames, means for turning said cranked rod and means for operating said feed-table, whereby the links can be adjusted in the way and for the purpose stated.

18. In a grain feeder, the combination with the main frame, the frame $g$ arranged to slide in guides $f$ in the main frame and having a series of links at each end, a feed-table composed of oppositely reciprocating sections mounted upon said links, a multiple crank-shaft on the main frame and rods connecting each table-section, and crank, and means for adjusting the said frame $g$ and its connected links, toward or from the front of the main frame, for the purpose stated.

19. In a grain feeder, the combination with the main frame and a feed-table composed of oppositely reciprocating sections mounted upon links, of an intermediate frame connecting said links, means for horizontally adjusting said intermediate frame, and means for operating the feed-table sections upon said links, substantially as described.

In testimony whereof I have hereunto signed this specification in the presence of witnesses.

FRANK A. OLIVA.

Witnesses:
A. H. GODDARD,
A. M. RINEHART,
M. HILL,
G. H. LAWTON.